Jan. 3, 1967

E. V. BUNTING ET AL 3,295,611

DRAWBAR HITCH ATTACHMENT

Filed April 13, 1964

INVENTORS.
ERNEST V. BUNTING,
HABIBUR RAHMAN &
DONALD J. KIESGEN
BY
Wolfe, Hubbard, Voit & Osann
ATTORNEYS.

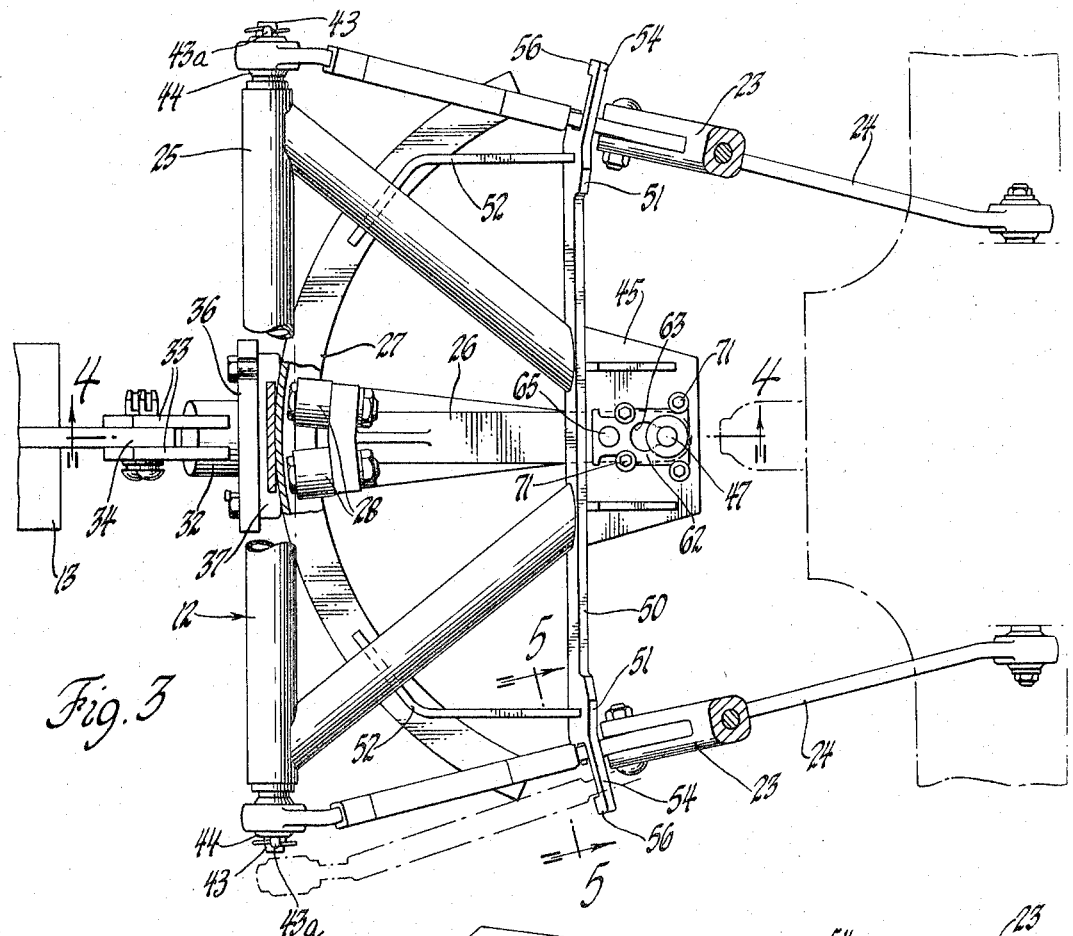
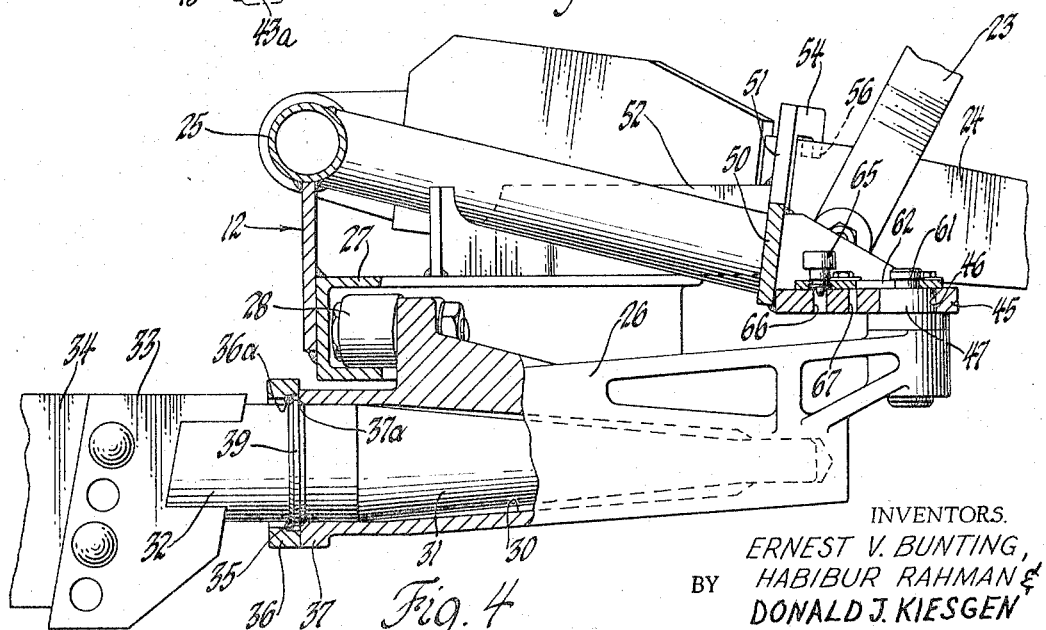

INVENTORS.
ERNEST V. BUNTING,
BY HABIBUR RAHMAN &
DONALD J. KIESGEN
Wolfe, Hubbard, Voit & Osann
ATTORNEYS.

United States Patent Office 3,295,611
Patented Jan. 3, 1967

3,295,611
DRAWBAR HITCH ATTACHMENT
Ernest V. Bunting and Habibur Rahman, Detroit, and Donald J. Kiesgen, Dearborn, Mich., assignors to Massey-Ferguson Inc., Detroit, Mich., a corporation of Maryland
Filed Apr. 13, 1964, Ser. No. 359,076
17 Claims. (Cl. 172—447)

This invention relates generally to agricultural tractors and more particularly concerns a drawbar attachment for such tractors.

The three-point hitch system for mounting implements on a tractor having a power lift arrangement for raising and lowering the implement with respect to the ground has been widely accepted. This "Ferguson system" permits draft control of the implement by transferring a portion of the implement weight and suction forces due to engagement with the ground to the drive wheels of the tractor. In this way, a light tractor is able to perform the work of a much heavier tractor.

The general aim of the present invention is to provide a drawbar attachment for such a three-point hitch linkage that enables the tongue of an implement to be coupled through the linkage acting as a rigid drawbar so that a selectable portion of the implement weight may be transferred to the tractor rear wheels.

A more particular object is to provide a tractor drawbar attachment detachably mounted on the tractor draft links which permits uniform weight transfer from the implement to the tractor in an amount selectively determined by the tractor operator.

An additional object is to detachably couple such an attachment to the tractor draft links in such a way that relative movement between the attachment and the draft links is precluded when the draft links are raised to transfer a selected portion of the implement weight to the tractor rear wheels.

Another object is to provide such an attachment with the drawbar mounted for lateral swinging movement on the attachment so that the tractor-implement combination can easily negotiate turns. A related object is to provide means for conveniently and quickly disconnecting the drawbar from its supporting structure on the hitch linkage.

It is yet another object to provide a drawbar attachment as characterized above which may be quickly and conveniently attached to the trailing ends of the lower draft links of the tractor.

Other objects and advantages of the invention will become apparent upon reading the following detailed description and upon reference to the drawings, in which:

FIG. 3 is an enlarged fragmentary plan view of the attachment shown in FIG. 2 with dash lines showing both the rear portion of the tractor body and an alternate position for one of the draft links disconnected from the attachment;

FIG. 4 is an enlarged, fragmentary view partly in section substantially as seen along the line 4—4 in FIG. 3;

While the invention will be described in connection with a preferred embodiment, it will be understood that we do not intend to limit the invention to that embodiment. On the contrary, we intend to cover all alternatives, modifications and equivalents as may be included within spirit and scope of the invention as defined by the appended claims.

Figure 1:
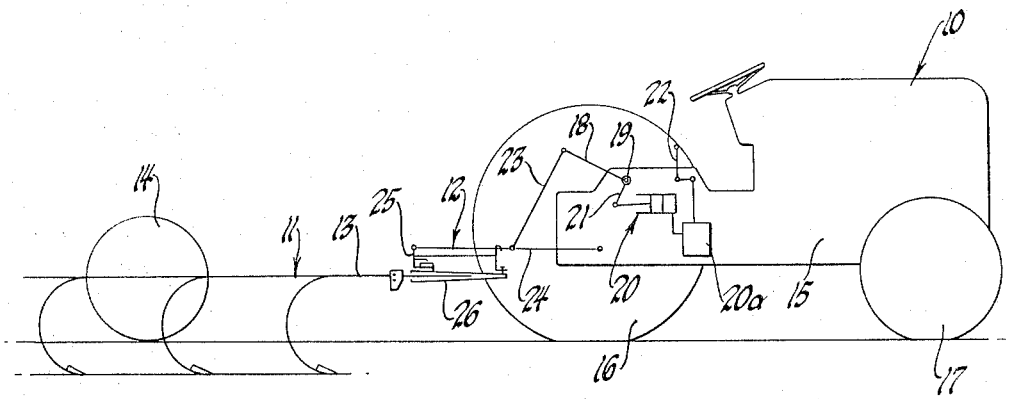
FIGURE 1 is a schematic side elevation of a tractor, with one rear wheel removed, and an implement, with one wheel removed, coupled together by a drawbar attachment embodying the present invention.
Figure 2:
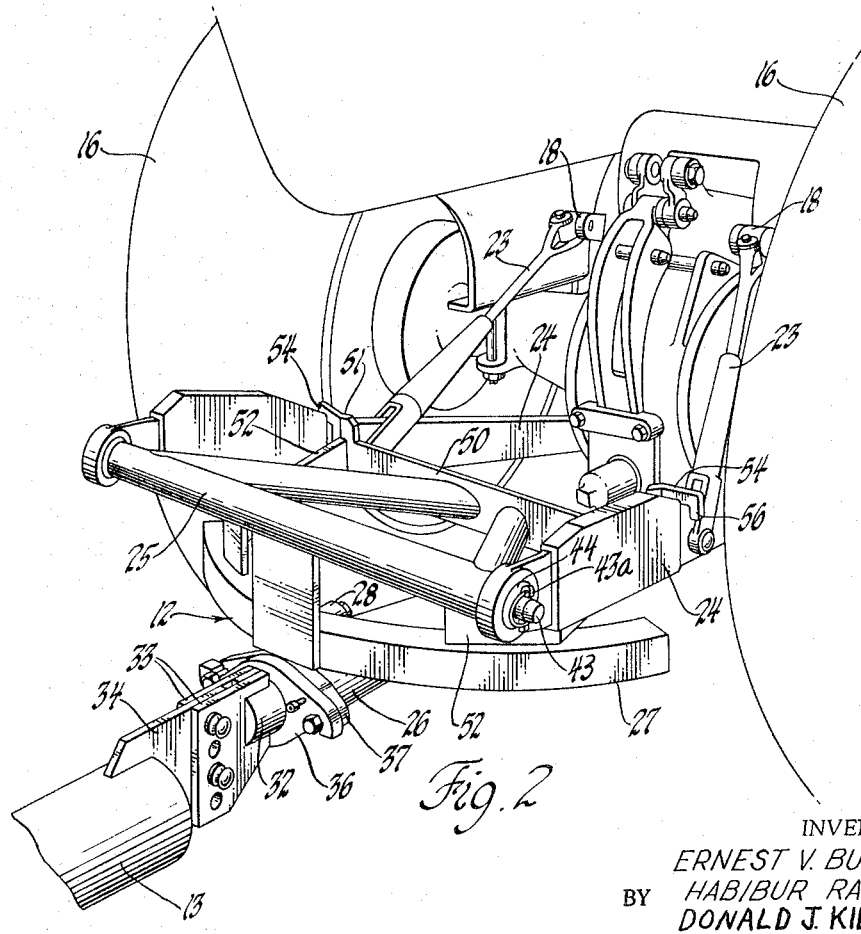
FIG. 2 is a fragmentary perspective of a drawbar attachment of the type diagrammatically illustrated in FIG. 1.

Turning now to the drawings, there is shown in FIGURE 1 a tractor 10 coupled to an implement 11 by a drawbar attachment 12 embodying the present invention. The exemplary implement includes a forwardly extending tongue 13 and supporting ground wheels 14 (only one of which has been shown). The illustrative tractor includes a body 15 supported by rear drive wheels 16 (only one of which is shown) and a pair of steerable front wheels 17. A power lift mechanism is embodied in the tractor 10 which includes a pair of lift arms 18 pivoted on a rock shaft 19 journalled in the tractor body. The lift arms are powered by a hydraulic actuator 20 which is coupled to the rock shaft by means of a crank arm 21. Fluid pressure is admitted to the actuator 20 from a source indicated at 20a which includes a conventional pump and valve arrangement under control of a manually positionable lever 22 which is movable by the tractor operator. The lift arms 18 are coupled by drop links 23 to raise and lower a pair of trailing draft links 24 pivoted for universal movement on the rear end portion of the tractor body.

Pursuant to the present invention, the drawbar attachment 12 includes a rigid frame 25 detachably connected to the trailing ends of the draft links 24 and a drawbar 26 pivotally mounted at its front end to the frame for lateral swinging movement and secured at its rear end in rigid alignment to the implement tongue 13. The frame 25 provides a lifting connection between the draft links 24 and the drawbar 26 so that a portion of the implement weight is transferred to the rear wheels 16 of the tractor when the actuator 20 is pressurized to raise the draft links.

In the preferred construction, a generally channel-shaped arcuate track 27 forms a part of the rigid frame 25 and a follower in the form of a pair of rollers 28 secured to the drawbar 26 defines the lifting connection between the drawbar and the frame. The arcuate track and follower mechanism, of course, permit weight transfer from the implement tongue 13 through the drawbar 26 to the frame 25 and thence to the tractor when the tractor and implement are negotiating a turn, as well as when the implement is aligned with the tractor. The drawbar 26 can thus swing up and down in unison with the draft links 24 and the drawbar also swings from side to side in an arcuate path defined by the forwardly opening channel 27.

It is also a feature of the invention that the implement tongue 13 is detachably secured by means of a cantilever lifting connection to the drawbar 26 in rigid alignment, and yet permits limited transverse tilting of the implement 11 with respect to the tractor 10. In the illustrated embodiment, the rear end of the drawbar 26 is formed with a cylindrical socket 30 formed to receive a conical shaped nose portion 31 of a shaft 32 carrying a pair of spaced plates 33 that sandwich a plate 34 fixed to the end of the implement tongue 13. A plurality of pins interconnect the plates 33, 34.

To hold the nose 31 within the socket 30 in rigid alignment while permitting torsional movements, a snap ring 35 is locked between a plate 36 on the shaft 32 and an end flange 37 formed on the drawbar 26. As shown in FIG. 4, the plate 36 is formed with a tapered face 36a which urges the snap ring 35 against one side of a raised annular ring 39 formed on the shaft 32. The other side of the annular ring 39 abuts a tapered shoulder 37a formed on the end plate 37.

Figure 9:
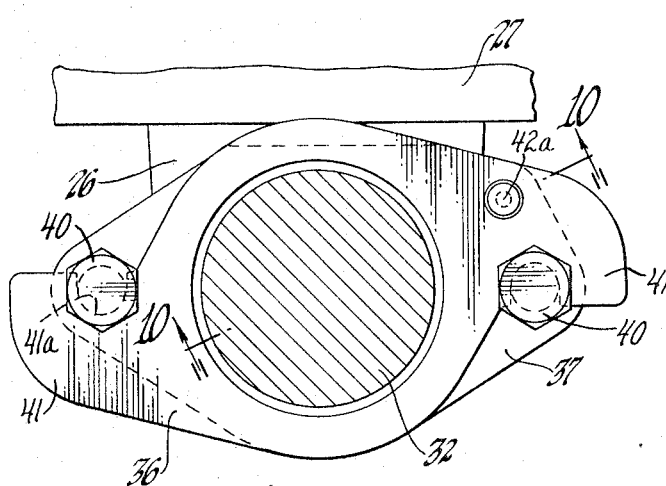
FIG. 9 is an enlarged fragmentary section taken substantially along the line 9—9 in FIG. 4.
Figure 10:
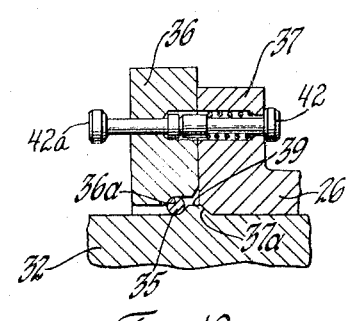
FIG. 10 is a fragmentary section taken substantially along the line 10—10 in FIG. 9.

For releasing the nose 31 from the socket 30, the plate 36 is detachably secured to the flange 37 by a plurality of bolts 40 threadably received in the flange. As shown in FIG. 9, the plate 36 is desirably formed with a pair of ears 41 which define oppositely opening recesses 41a adapted to receive the bolts 40. A spring biased lock pin 42 mounted in the flange 37 serves to normally hold the ears 41 in engagement with the bolts 40 (see FIG. 10). By depressing a release pin 42a, the lock pin 42 may be disengaged from the plate 36 and the plate may then be rotated in a counterclockwise direction as seen in FIG. 9, moving the ears 41 away from the bolts 40 when the nose 31 is to be withdrawn from the socket 30.

It will be appreciated that the conically formed nose 31 of the shaft 32 facilitates backing up the tractor and running the drawbar socket 30 over the nose 31. As a result of this construction, the implement tongue 13 is secured by means of a cantilever lifting connection in rigid alignment with the drawbar 26. In other words, the tongue and the drawbar swing in unison both up and down and from side to side. However, the shaft 32 can freely rotate within the socket 30, and hence lateral tilting movement of the implement relative to the tractor is readily accommodated.

The frame 25 is preferably of heavy construction and formed with a generally triangular shape. The base portion of the triangular frame carries a pair of transversely extending connecting pins 43 adapted to be received in sockets 44 defined at the trailing ends of the draft links 24. Suitable lock pins 43a are insertable through openings in the pins 43 to maintain the pins in the sockets 44. At the apex portion, the generally triangular frame 25 carries a mounting plate 45 disposed centrally between the draft links 24. The mounting plate 45 defines an aperture 46 to receive an upstanding pivot post 47 on the forward portion of the drawbar 26. The pivotal connection afforded by the pivot post 47 and the aperture 46 thus permits lateral swinging movement of the drawbar 26 in the arcuate path defined by the forwardly open channel 27.

In further accordance with the invention, the attachment 12 includes means for resisting relative pivotal movement between the frame 25 and the draft links 24. For this purpose, a stabilizing web 50 is secured to the mounting plate 45 and detachably interconnects the draft links 24 intermediate their end portions. The two ends 51 of the transverse web 50 are also rigidly secured to the arcuate track 27 by reinforcing bars 52.

Figure 5:
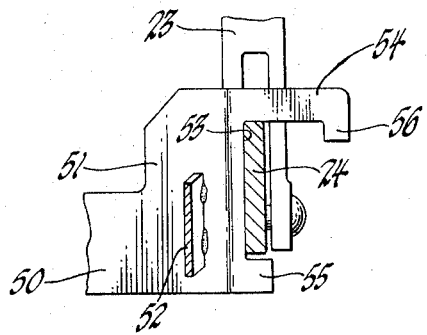
FIG. 5 is an enlarged fragmentary sectional view substantially as seen along the line 5—5 in FIG. 3.

For detachably interconnecting the frame 25 and the draft links 24, the web ends 51 are formed to define generally U-shaped outwardly facing openings 53 dimensioned to receive the draft links 24 (see FIG. 5). The close fit afforded between the U-shaped openings and the draft links serves to prevent relative arcuate movement in a vertical plane between the frame 25 and the draft links 24 when the links are raised by the lift arms 18.

In the preferred embodiment, each of the web ends 51 is formed with upper and lower projections 54 and 55 which define the U-shaped openings 53. The upper projections 54 are preferably somewhat longer than the lower projections 55 and also carry a downwardly directed hook 56 at their outer ends. In this way, the upper projection 54 of the web 50 can be freely rested on the upper surface of the draft links 24 as shown in the dash line portion of FIG. 3 when the drawbar attachment 12 is being mounted on the tractor.

It will be understood that the hooks 56 serve to prevent the web from falling off the draft links as the sockets 44 are slipped over the connecting pins 43 at the base of the frame 25. When the pins 43 and sockets 44 are completely engaged, the draft links 24 are, of course, firmly seated in the U-shaped openings 53 at the ends of the web 50.

Pursuant to another aspect of the present invention, the drawbar 26 may be quickly and easily disconnected from the attachment frame 25. To this end, the pivot post 47 at the forward end of the drawbar is formed with an annular groove 61 at its upper end. To retain the pivot post 47 in the aperture 46 defined in the mounting plate 45, a slidable plate 62 is carried on the mounting plate so as to selectively engage the groove 61 in the pivot post. In the illustrated embodiment, the plate 62 preferably defines a keyhole-shaped slot 63 for receiving the pivot post 47. As shown in more detail in FIGS. 6 and 7, the groove 61 at the top of the pivot post is engaged by the plate 62 adjacent the necked down portion of the keyhole slot 63 when the plate is shifted to the left or solid line position in FIGS. 6 and 7. The plate and groove are, of course, disengaged when the plate is shifted to the right or dash line position.

Figure 7:
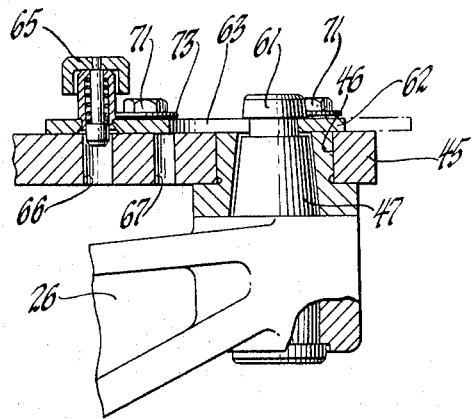
FIG. 7 is an enlarged vertical section taken substantially along the line 7—7 in FIG. 6.
Figure 8:
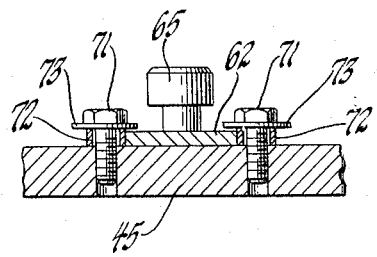
FIG. 8 is a further sectional view taken substantially along the line 8—8 in FIG. 6.

To insure that the plate 62 remains in one or the other of its selected positions, a movable latch pin 65 is selectively registered with alternative apertures 66 and 67 defined in the mounting plate 45. The rearward, or left hand aperture 66, as seen in FIG. 7, locks the plate in the pivot post retaining position. Conversely, the forward, or right hand aperture 67, as seen in FIG. 7, frees the pivot post 47 to drop from its receiving aperture 46.

Figure 6:
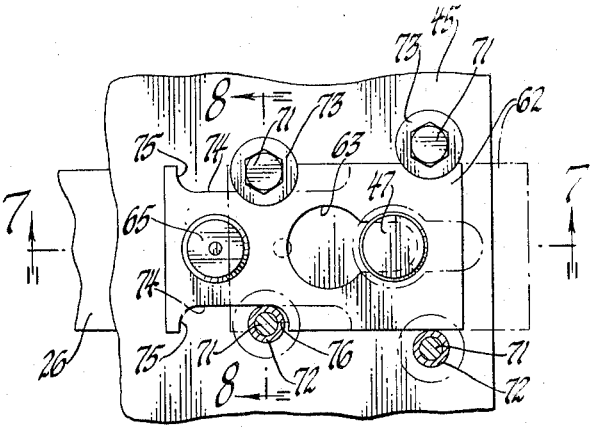
FIG. 6 is an enlarged partial view of the apparatus shown in FIG. 3 to illustrate the pivotal drawbar connection and disconnecting apparatus.

For guiding the sliding movement of the plate 62 as well as to prevent it from becoming disassociated from the mounting plate 45, a plurality of cap screws 71 are desirably received in suitable openings in the mounting plate adjacent the edges of the sliding plate. Each of the screws 71 locates a bushing 72 adjacent the edges of the sliding plate 62 and a washer 73 or the like over a portion of the plate's upper surface. In the preferred embodiment, the plate 62 is recessed at a portion 74 of each edge and two of the screws 71 are located so that their respective bushings 72 cooperate with the recesses 74. As shown in FIG. 6, the plate 62 defines a pair of abutments 75 and 76 adjacent the ends of the recesses 74 to prevent the plate 62 from slipping endwise of the mounting plate 45.

From the above it will be seen that the attachment 12 provides a sturdy drawbar coupling for transferring a portion of the implement weight from the tongue 13 to the rear tractor wheels 16. The drawbar attachment can be quickly and conveniently mounted on the tractor draft links by inserting the pins 43 in the sockets 44. The laterally swinging drawbar 26 can also be easily disconnected from the attachment frame 25 by simply disengaging the plate 62 from the groove 61 in the pivot post 47. In addition, the implement tongue 13 can be quickly disconnected from the drawbar 26 by depressing the release pin 42a and rotating the lock plate 36 out of engagement with the bolts 40.

We claim as our invention:

1. An attachment for coupling the tongue of a ground supported unit to a tractor having a power lift mechanism for raising and lowering a pair of trailing draft links pivotally mounted on the tractor comprising, in combination, a hitch frame detachably secured to the trailing ends of said draft links, said frame having a forward portion disposed between said draft links adjacent the rear of said tractor, a laterally swinging drawbar pivoted at its forward end on said forward frame portion, means including interfitting bearing members defining a cantilever connection for maintaining said tongue and said drawbar in rigid longitudinal alignment while permitting relative rotation therebetween, said frame defining an arcuate track disposed generally horizontally below said draft links, said drawbar having a follower thereon engaging said track so as to provide a lifting connection between said frame and said drawbar, and means detachably interconnecting said forward frame portion and an intermediate portion of said draft links to prevent relative arcuate movement in a vertical plane between said frame and said draft links when the latter are actuated by said power lift mechanism.

2. The attachment defined in claim 1 wherein said frame is pivotally mounted on the trailing ends of said draft links and said interconnecting means includes a transverse web member secured to said forward frame portion with substantially outwardly facing openings defined in the ends thereof for receiving said draft links.

3. The attachment defined in claim 1 wherein said drawbar includes an upstanding pivot post on its forward end received in a cooperating aperture defined in said forward frame portion and said forward frame portion carries means for detachably retaining said pivot post in said aperture.

4. The attachment defined in claim 3 wherein said retaining means includes a shiftable plate having a keyhole shaped slot defined therein and the upper end of said pivot post is formed with an annular groove so that said plate is selectively engageable in said groove.

5. The attachment defined in claim 4 wherein said plate carries a movable pin adapted to register with a cooperating recess formed in said forward frame portion when said plate engages said groove to retain said pivot post in said aperture.

6. The attachment defined in claim 1 wherein said tongue is formed with a conical nose portion and said drawbar is formed with a complementary socket for receiving said nose portion to permit relative rotation between said tongue and said drawbar and lateral tilting of the implement relative to the tractor.

7. An attachment for coupling the tongue of a ground supported unit to a tractor having a power lift mechanism for raising and lowering a pair of trailing draft links pivotally mounted on the tractor comprising, in combination, a rigid generally triangle-shaped hitch frame having a pair of outwardly extending pivot pins aligned with the base portion thereof, said draft links defining sockets in the trailing ends thereof for receiving said pivot pins, said frame having a mounting plate secured to the apex thereof, a laterally swinging drawbar pivotally mounted at its forward end on said mounting plate, means including interfitting bearing members defining a cantilever connection for maintaining said tongue and said drawbar in rigid longitudinal alignment while permitting relative rotation therebetween, a forwardly opening, generally channel-shaped arcuate track secured below said frame, said drawbar having a follower roller thereon adapted to roll within said channel-shaped track to provide a lifting connection between said frame and said drawbar, and a stabilizing web secured to said mounting plate and extending transversely thereof, said web defining generally U-shaped outwardly facing openings at the ends thereof for receiving said draft links to prevent relative arcuate movement in a vertical plane between said frame and said draft links when the latter are actuated by said power lift mechanism.

8. The attachment defined in claim 7 wherein the ends of said web are formed with outwardly extending upper and lower projections defining said generally U-shaped openings, said upper projections being longer than said lower projections and each having a downwardly directed hook defined at the outer end thereof whereby said upper web projections are engageable with the upper surface of said draft links as said pivot pins are received in said sockets.

9. An attachment for coupling the tongue of an implement to a tractor having a power lift mechanism comprising, in combination, a drawbar pivoted on said mechanism for lateral swinging movement, said tongue having a conically shaped nose portion, said drawbar having a complementarily formed socket for receiving said nose portion, said tongue formed with a raised annular ring thereon adjacent said nose portion, a lock plate rotatably mounted on said tongue rearwardly of said annular ring, and means for detachably interconnecting said lock plate to said drawbar locking said nose portion within said socket while permitting relative rotation between the tongue and the drawbar.

10. The attachment defined in claim 9 wherein said lock plate being formed to define a pair of oppositely opening recesses, said drawbar having a flange thereon mounting a pair of rearwardly projecting bolts adapted to mate with said recesses when said lock plate is rotated in one direction, and releasable means interposed between said plate and flange for normally preventing rotation of said lock plate in the opposite direction.

11. An attachment for coupling the tongue of an implement to a tractor having a power lift mechanism comprising, in combination, a drawbar pivoted on said mechanism for lateral swinging movement, said tongue having a conically shaped nose portion, said drawbar having a complementarily formed socket for receiving said nose portion, said tongue formed with a raised annular ring thereon adjacent said nose portion, a lock plate rotatably mounted on said tongue rearwardly of said annular ring, a thrust bearing member surrounding said tongue between said lock plate and said raised annular ring, and means for detachably interconnecting said lock plate to said drawbar locking said nose portion within said socket by means of said bearing member and said annular ring while permitting relative rotation between the tongue and the drawbar.

12. An attachment for coupling the tongue of a ground supported unit to a tractor having a power lift mechanism for raising and lowering a pair of trailing draft links pivotally mounted on the tractor comprising, in combination a hitch frame detachably secured to the trailing ends of said draft links, said frame having a forward portion disposed between said draft links adjacent the rear of said tractor, a laterally swinging drawbar pivoted at its forward end on said forward frame portion, means for securing said tongue to said drawbar for transmitting draft and lifting forces therebetween, said means including interfitting bearing surfaces defining a cantilever connection for maintaining said tongue and drawbar in rigid longitudinal alignment while permitting relative rotation therebetween, and means detachably interconnecting said forward frame portion and an intermediate portion of said draft links to prevent relative arcuate movement in a vertical plane between said frame and said draft links when the latter are actuated by said power lift mechanism.

13. A connection for transferring both a pulling load and a lifting load from a tractor to an implement coupled thereto, said connection comprising, in combination, a vertically movable hitch mechanism mounted on the tractor, means for raising and lowering said hitch mechanism, a drawbar carried by said hitch mechanism for laterally swinging movement, an elongated tongue member adapted to be rigidly secured at one end to the implement, a socket member secured to said drawbar, said tongue having a nose at the other end formed with axially spaced cylindrical portions joined by an intermediate portion, said socket member having internal axially spaced cylindrical portions corresponding in location and diameter to the tongue cylindrical portions and joined by an intermediate portion, said axially spaced cylindrical portions of said tongue and socket coacting with one another to define a cantilever connection for transmitting lifting loads between said members while permitting relative rotation therebetween, said socket member intermediate portion having a larger diameter at any point throughout its length than the diameter of corresponding points throughout the length of the intermediate portion on said tongue member, and means for releasably locking said tongue member cylindrical portions in said socket member cylindrical portions so as to transmit pulling loads between said members while also permitting relative rotation between said members.

14. The connection of claim 13 wherein the axially spaced cylindrical portion in said tongue that is nearest to the implement is of greater diameter than the other cylindrical portion.

15. The connection of claim 14 wherein the intermediate portion on said tongue forms a cone section joining the cylindrical portion of greater diameter with the other cylindrical portion.

16. The connection of claim 13 wherein said releasable locking means comprises radial surfaces on said tongue member and said socket member and an intermediate element positionable between said surfaces to permit relative rotation between said members while transmitting a pulling load between the same.

17. An implement-tractor combination comprising a hitch mechanism including a drawbar pivoted on the tractor for laterally swinging movement and having a rearwardly facing conical socket, a power lift mechanism on the tractor for raising and lowering the drawbar, a tongue on said implement having a conically formed end seated snugly within said socket so as to hold the tongue in rigid longitudinal alinement with the drawbar and to define a cantilever lifting connection between the tongue and drawbar, and means defining a pulling connection releasably locking said end against withdrawal from said socket while permitting relative rotation between the tongue and the drawbar.

References Cited by the Examiner

UNITED STATES PATENTS

| | | |
|---|---|---|
| D. 143,970 | 2/1946 | Heath. |
| 1,333,384 | 3/1920 | Buller. |
| 1,610,902 | 12/1926 | Tomlinson _____ 280—510 X |
| 2,473,357 | 6/1949 | Blunier _____ 172—450 X |
| 2,569,579 | 5/1952 | McKay _____ 172—450 X |
| 2,602,389 | 7/1952 | Markel _____ 172—275 X |
| 2,947,368 | 8/1960 | Jadoul _____ 172—449 |

FOREIGN PATENTS 170,797 3/1960 Sweden.

ABRAHAM G. STONE, *Primary Examiner.*
WILLIAM A. SMITH III, *Examiner.*